United States Patent [19]
Franklin et al.

[11] 3,854,209
[45] Dec. 17, 1974

[54] IMPRESSION SYRINGE

[76] Inventors: Mark E. Franklin, 29 Kaster Dr., Freehold, N.J. 07728; James R. Schmidt, 33 Birmingham Dr., Englishtown, N.J. 07726

[22] Filed: June 23, 1972

[21] Appl. No.: 265,731

[52] U.S. Cl................................ 32/60, 128/234
[51] Int. Cl............................................ A61c 5/04
[58] Field of Search........ 128/234, 238, 239, 218 R, 128/218 A, 218 D; 32/60

[56] References Cited
UNITED STATES PATENTS

| | | | |
|---|---|---|---|
| 1,223,243 | 4/1917 | Bessesen | 128/234 |
| 1,923,409 | 8/1933 | Ziegler | 128/239 |
| 2,098,658 | 11/1937 | Goltman et al. | 128/239 X |
| 3,593,423 | 7/1971 | Jones et al. | 32/22 |
| 3,605,745 | 9/1971 | Hodosh | 128/218 D |

*Primary Examiner*—Robert Peshock
*Assistant Examiner*—J. Q. Lever
*Attorney, Agent, or Firm*—Edward F. Costigan, Esq.

[57] ABSTRACT

A device for use in the deposition of impressionable material into a desired site, the resulting impression being used in the fabrication process for the formation of one or more synthetic tooth structures. The device is quite adaptable to loading with impressionable material by means of suction and, with slight modification, is capable of expelling such material to the site desired by means of air pressure.

4 Claims, 16 Drawing Figures

IMPRESSION SYRINGE

This invention relates to an improved device for use in the dental art.

More particularly, this invention relates to an impression syringe for use in the production of a mold which is later used in the fabrication process of a synthetic tooth structure.

In general, impression syringes are usually used in the dental art for the deposition of impressionable material at a desired site for the production of a mold, the latter being later utilized in the fabrication process of a synthetic dental structure. Impression syringes are of two types. One being of a design wherein a plunger, which is slideably moveable within a sleeve or housing, is actuated by hand pressure to expel the impressionable material from the sleeve to the desired location. The other type of syringe, which is of a more advance design, utilizes compressed air in the expulsion and deposition of the impressionable material at the desired location.

Of the two types, the syringe which is manually actuated tends to induce fatigue and inconsistent results because its normal handling characteristics are of a rather cumbersome nature. In some cases, during the loading of the above syringe, the impressionable material utilized many times becomes entrapped with air. As a result, during the process of fabricating a mold, an imperfect or inaccurate impression is produced in the material, mainly, because of the unequal flow of such material during the initial state of the process. However, in general, it may be stated that this type of syringe is most generally utilized by the dental profession even though, in many cases, the loading characteristics are such that the clothing and hands are many times soiled and even stained during such loading procedures. And, it has been found that as different and more advanced types of impressionable material became available to the dental profession, the hand-actuated syringes of the art may have to be modified if not altogether replaced.

The more advanced type of syringe which has currently become available to the dental profession utilizes compressed air to expel the impressionable material from the device rather than hand pressure. The disadvantage of the latter syringe lies in its bulkiness, which tends towards undesirable handling characteristics of the device at a stage of the impressioning process where technique and, especially, control of the device are of upmost importance in producing a mold of the quality and perfection desired. Further, it may be stated that this type syringe is only adaptable to the one specific connector of a given air source. If, perchance, the dental office has several units, each with a connector of different design, a separate syringe must be selected for operativeness in the impression procedure.

Further, the latter syringe unit is adapted with a disposable syringe cartridge of a design which is difficult and time consuming to assemble to the main housing of the device. And, the latter disadvantage is liable to occur at a point in the fabricating process where time is a critical factor. A further disadvantage is the loading of the advanced device with material because it lends itself to soiling of the hands and clothing. The latter procedure of loading is about as convenient as the manually actuated syringes heretofore discussed. And, still further, the disposable components of the unit are more expensive than that of conventional syringes. Also, as new and more advanced materials become available for use in the fabrication of such a mold, it may become necessary to discard the device, especially if the material is of a reversible elastic nature.

What is needed in the art is a syringe for use in fabricating a dental mold which has the following features, viz:

1. A device which assures efficient control in the effective placement of the impressionable material at the site desired.
2. A device which is conveniently loaded with a variety of impressionable materials.
3. A device which is easily cleansed during and following use.
4. A device which may be easily sterilized without damage or a device which does not contain disposable elements of a relatively expensive nature.
5. A device which produces a mold which is consistently of a high quality and perfection.
6. A device which may be utilized to obtain a product of the perfection desired at sites which heretofore were considered difficult, if not impossible, to obtain an adequate impression of the quality desired.
7. A device which may be easily and conveniently utilized during the impression stage of the fabrication process to produce a product having the optimum in perfection in a highly efficient manner within a relatively short span of time.
8. A device which is easily adaptable to a large majority of existing accessory systems presently in use by the dental profession.
9. A device which is economical to purchase, replace and maintain accompanied with the normal durability of existing systems.

The subject invention answers all of the aforesaid needs of the art with special emphasis on an impression syringe for use in the production of a mold, such device being adaptable for loading with impressionable material by means of suction and which also may be actuated for the deposition of such material at a desired location by means of air pressure.

It is, therfore, an object of this invention to provide a dental syringe of improved construction for use in the deposition of impressionable material at the site desired.

Another object is to provide such syringe with the ability to be loaded with impressionable material by suction.

And still another object is to provide the aforesaid device with the ability to expel impressionable material from its housing through the use of compressed air.

A further object is to provide the aforesaid syringe with the ability to displace gingival tissue circumscribing such site during the deposition of such impressionable material.

A still further object is to provide control of the displacement of said tissue by manually actuated sequential valves.

Other objects and many of the attendant advantages of the device of this invention will become more readily apparent to one skilled in the art from a reading of the following detailed specification together with the accompanying drawings, wherein:

Figures 1, 2:
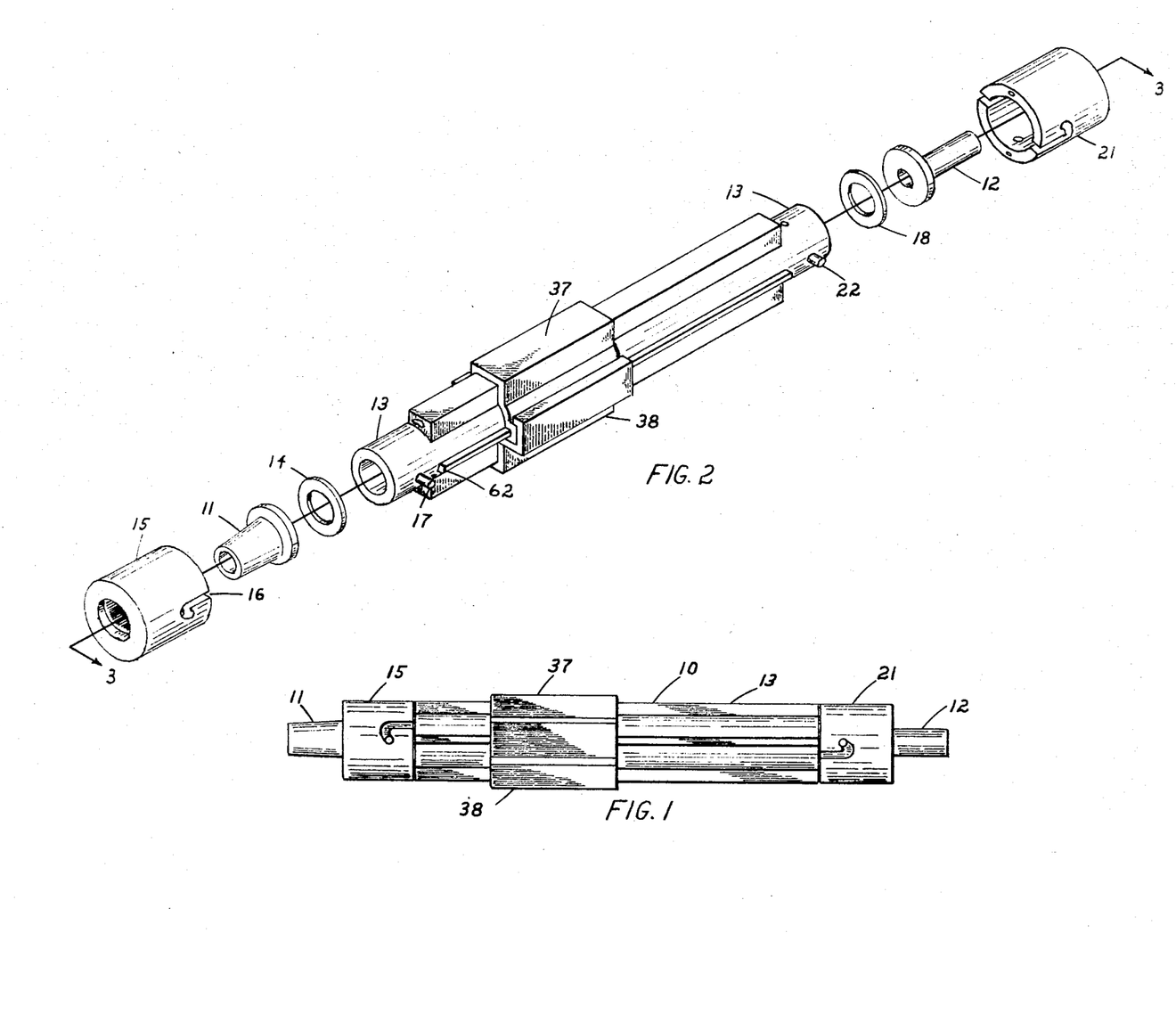
FIG. 1 is a side view of the device of this invention adapted with elements for suction loading of impressionable material.
FIG. 2 is an exploded view of the device of FIG. 1.

The preferred embodiment of the invention lies in FIG. 1 wherein the assembled structure of the device 10 is shown ready for loading with impressionable material. One end of the device is adapted with a head 11 for insertion into the source of impressionable material (not shown), while the other end of the same device is provided with a fitting 12 adapted for communicating relationship with a suction source (not shown).

In the exploded view, shown in FIG. 2, the head 11 and the fitting 12 are more pictorially defined. As may be more clearly seen, the head 11 may be secured to the housing 13 with a sealing ring 14 therebetween by engagement means, the latter consisting essentially of a coupling unit or connector 15 and pin 17. The unit 15 is provided with a J-like channel 16 and is engageable to the pin 17 by passing the unit 15 over the housing 13 until the pin passes entirely into the channel 16. Thereafter, a slight counter-clockwise movement of the coupling unit 15 will secure the aforementioned elements in position against the opening of the housing 13.

At this point, the opening at the opposed end of the housing 13 is provided with a fitting 12 which is also engaged to the housing 13 with an annular seal 18 therebetween. The manner of engagement is the same as heretofore described. To reiterate the process, the coupling unit 21 is passed over the suction fitting 12, seal 18, and the open end of the housing 13. The described unit 21 is then manually adjusted until the pin 22 enters and is secured in the J-like channel of the unit 21 in the aforedescribed manner.

Figure 3:
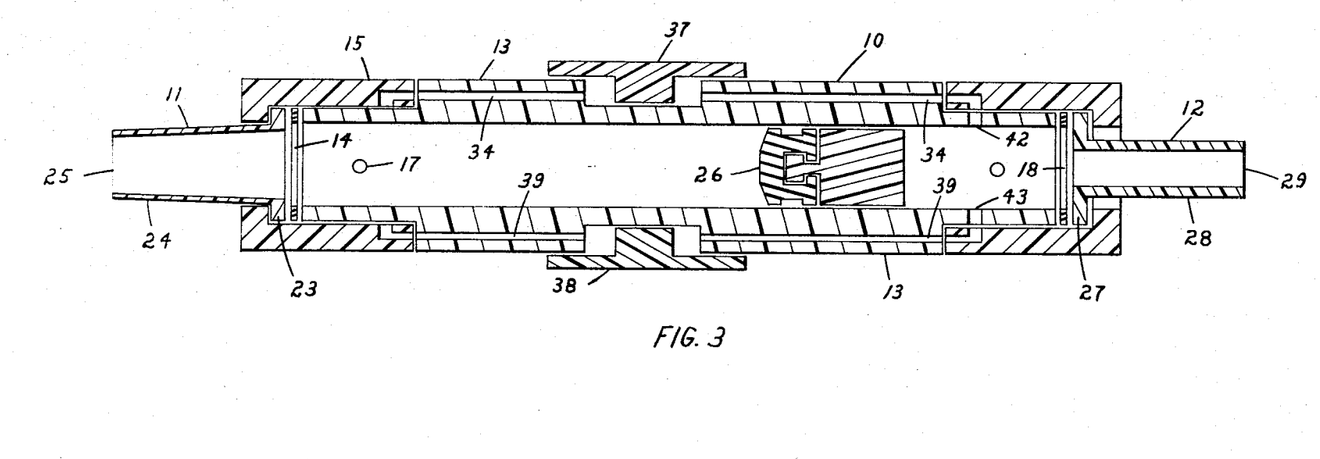
FIG. 3 is a cross-sectional view of the device of FIG. 2 taken on line 3—3.

The correlation between the exterior and the interior of the device may be more clearly seen by reference to FIG. 2 and the cross-sectional view set forth in FIG. 3. As shown, the unitary head 11 of one-piece construction is provided with an annular base 23 upon which is mounted a body 24 terminating in an open end 25. The hollow housing 13 is provided with a plunger 26 which freely moves in a slideable fashion in either direction depending on the nature of the procedure being used.

The fitting 12, also of one-piece construction on the opposite end of the housing 13, is provided with a base 27 having a body 28 of open construction terminating in an annular-like end 29. The unit 10, as shown in these figures, is adapted for suction loading of the housing 13 with impressionable material.

Figure 4:
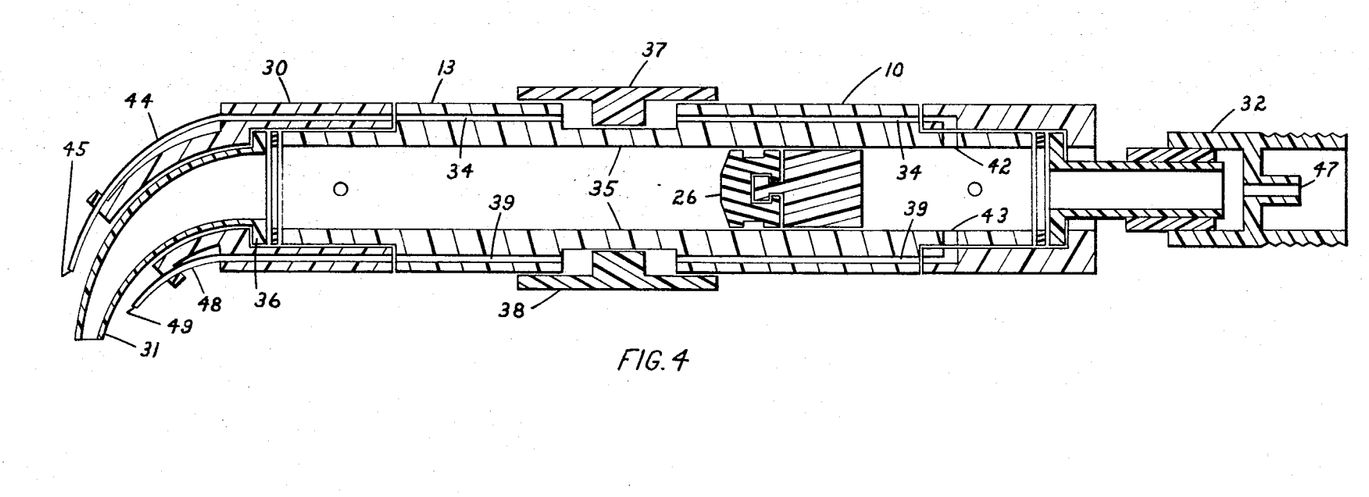
FIG. 4 is a cross-sectional view of the device of FIG. 1 adapted with components for the ejection of impressionable material.

Referring now to the cross-sectional view of FIG. 4, it becomes evident that the housing 13 of the device is adapted with a head 31, coupling unit 30, and fitting 32 of different construction than was heretofore encountered in the views described. The unit 10, as shown in this figure, is adapted with elements which now give the device utility in the process of the directional expulsion of the impressionable material from the interior of the housing 13. The latter housing 13 is provided with a fitting 32 which is adapted for engagement with all sources of pressure found in a dental office. This largest volume of air propels the plunger 26 through the interior longitudinal chamber 35 of the housing 13. And, the forward movement will push any and all impressionable material out the directional expulsion head 31 to the site desired.

The sides of the annular housing 13, as shown in FIG. 4, are also provided with an upper and lower longitudinal passageway 34 and 39 for use in directing an ancillary air-flow from such pressure source through the sides of the annular housing to curve tubes 44 and 48 in the area adjacent to the expulsion head 31. The control of such air-flow is accomplished by sequential valves 37 and 38 which are manually operated. The operation of the latter valves will be hereinafter more fully described. The hollow expulsion head 31 of one-piece construction, as shown, is provided with an annular base 36 upon which is mounted a curved body of gradually decreasing diameter terminating in a relatively small open end of annular construction for use in directing the expulsion of impressionable material from the interior of the housing 13 to the site desired. Also, the ancillary air-flow from the same pressure source is directed by means of curved tubing heretofore mentioned into the gingival tissue circumscribing the area of deposition of the impressionable material. The latter air-flow is utilized to displace such tissue during the deposition process. Such air-flow displacement of the gingival margins can be controlled by the manual actuated valves located on the syringe during the impression procedure. In this manner, the air gently displaces the tissue from the tooth structure to permit impressioning of the sub-gingival margin areas.

Figures 5, 6:
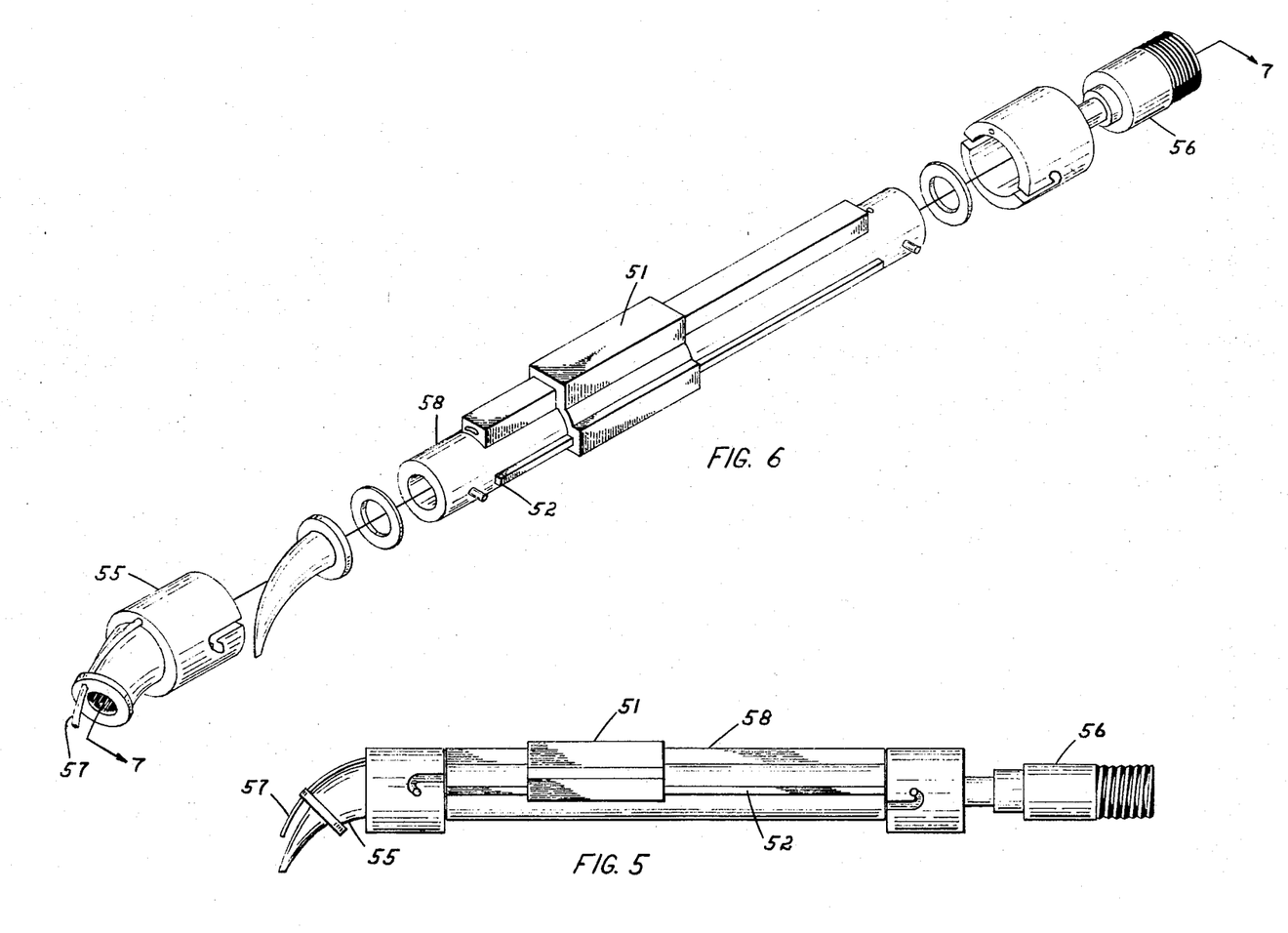
FIG. 5 is a side view of another embodiment of this invention adapted with elements for the ejection of impressionable material.
FIG. 6 is an exploded view of the device of FIG. 5.

Referring now to FIG. 5, an alternate embodiment (single channel housing) is shown wherein the air control valve 51 unites the housing 58 by means of flanges 52 on either side of the housing 58. In this embodiment, the valve 51 is movable in a longitudinal fashion to control the air flow in passageway 60 (reference FIG. 7) integral to the housing 58.

FIG. 6 is an exploded view of the device of FIG. 5 showing the component parts thereof. Note should be taken that in these two figures, the coupling unit 55 and fitting 56 are similar in construction to that of the device of FIG. 4 except that on the coupling unit 55 there is only one curve tube 57 for the displacement of the gingival tissue.

Figure 7:
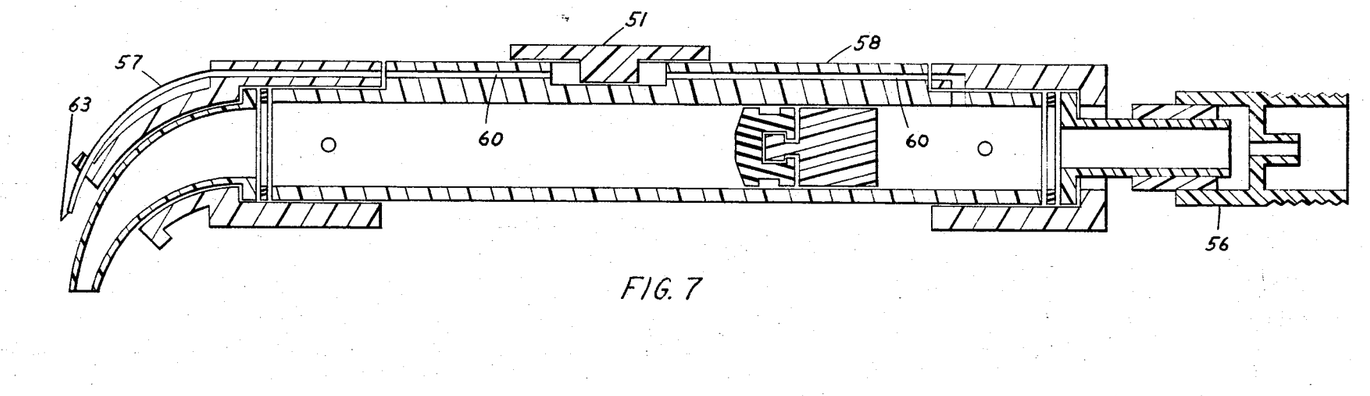
FIG. 7 is a cross-sectional view of the device of FIG. 6 taken on line 7—7.

FIG. 7 shows the interior of the alternate embodiment of the device. Note in FIG. 7 that the air passageway 60 longitudinally traverses substantially the entire side of the housing 58 from front to rear. In this embodiment, the control valve 51 is used to variably regulate the air passage through the passageway 60 to the curved tube 57 and out the annular open end 63.

Figure 8A:
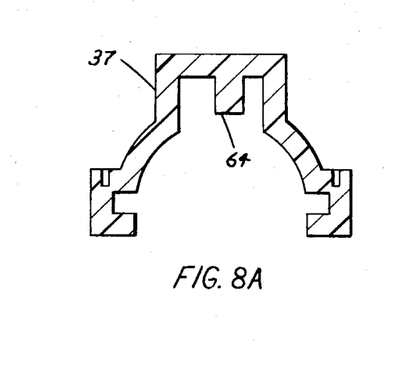
FIG. 8A shows a cross-sectional view of the upper air-flow control valve.
Figure 8B:
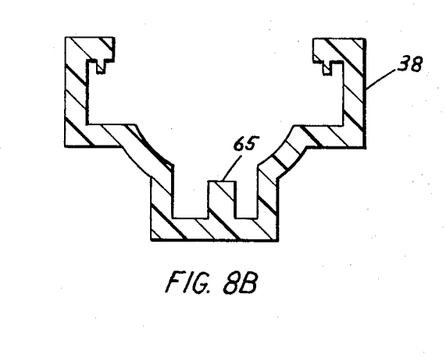
FIG. 8B shows a cross-sectional view of the lower air-flow control valve, which separably engages the valve of FIG. 8A.
Figure 8C:
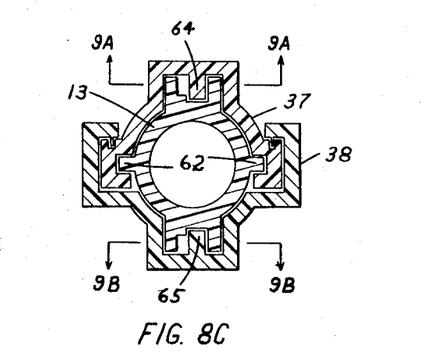
FIG. 8C is a cross-sectional view of the assembly which is produced by the aforesaid engagement of the upper and lower valves to the housing.
Figure 9A:
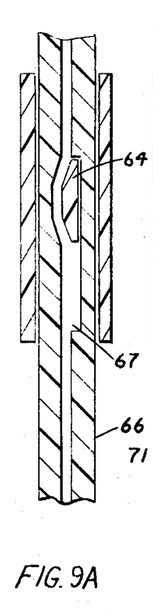
FIGS. 9A, 10A and 11A show the sequential movement of the control valve in the upper flow chamber.
Figure 10A:
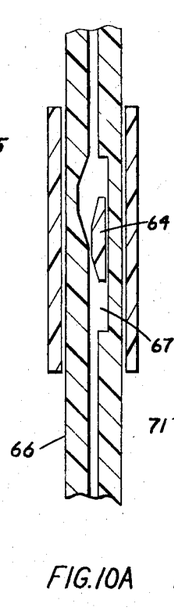
Figures 11A, 11B:
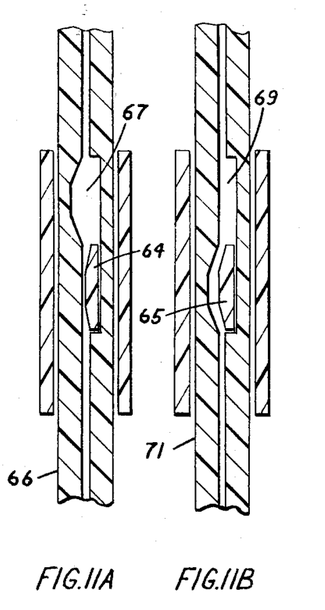

As shown in FIGS. 8A and 8B, the air flow control valves for the air-flow control of the device shown in FIGS. 1 to 4 consist structurally of two components 37 and 38 which, when assembled and attached to the housing 13, produce the cross-section shown in FIG. 8C. In the latter figure, the housing 13 is adapted with longitudinal flanges 62 upon which the assembled control valves 37 and 38 travel in a longitudinal direction towards the front or rear of the air-flow chambers in housing 13. Each one of the components in FIGS. 8A and 8B is provided with a projection 64 and 65 similar in construction and somewhat in function to a follower which longitudinally traverses a surface of the air control chamber of the housing 13. For instance, the projection 64 in the upper air-flow chamber 67 passes through the stage shown in FIG. 9A until it separably engages the stationary surface 66 as shown in FIG. 10A. At this point, the flow of air through the upper longitudinal passageway is prevented. However, in a sequential manner, the projection 65 in the lower air control chamber 69 separates from the stationary surface 71 until the lower passageway 69 is open for the passage of air, as shown in FIG. 11B.

Figure 9B:
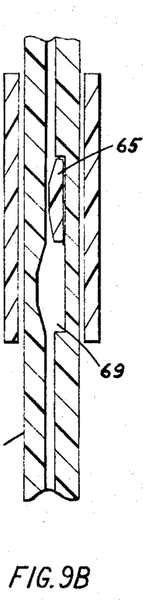
FIGS. 9B, 10B and 11B show the sequential movement of the control valve in the lower flow chamber.
Figure 10B:
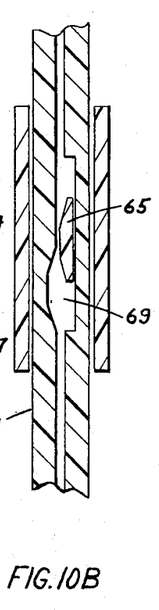

The flow control system, as shown in foregoing Figures, consists of three stages which may be simplified for a better understanding of the system. First, in stage 1, the upper flow chamber 67 is open while the lower flow chamber 69 is closed as shown in FIGS. 9A and 9B. Note the engagement of the projection 65 with the surface 71. In the second stage of the process, as shown in FIGS. 10A and 10B, both projections 64 and 65 in the upper 67 and lower flow chamber 69 are separably engaged by the stationary surfaces 66 and 71 of both aforementioned chambers. In the last stage, the upper flow chamber 67 is closed by the engagement of projection 64 with the stationary surface 66. However, in the latter case, the projection 65 is not engaged by the surface 71, and therefore the lower flow chamber 69 is open. Thus, by a simple manipulation of the assembled valves in a longitudinal direction, either forward or backward, the described sequence takes place and the flow of air through the lower and upper passageways may be sequentially controlled.

In operation, a suction hose from a conventional unit (not shown) is attached to the loading fitting or attachment 12. The head 11 is placed in a source of impressionable material and suction is applied. As a result, the material is drawn into the head 11 through opening 25 and thence into the interior of the housing 13. FIG. 3 shows a view of the device provided with the attachments necessary to carry out the suction process properly.

After the device is loaded with impression material, the head 11 and the coupling unit 15 are changed to those shown in FIG. 4. The fitting, or rear adaptor attachment 32, also added, would then be connected to the compressed air supply of the dental handpiece (not shown). When activated, the compressed air would enter the opening 47 in the rear adaptor attachment or fitting 32. A portion of this air would flow through openings 42 and 43 and down through the longitudinal passageways 34 and 39 in the housing 13 until such air reached the flow chambers controlled by sequential valves 37 and 38. At this point, the control valves 37 and 38, functioning simultaneously, would be used by the operator to control the amount of air allowed to continue through the remainder of the longitudinal passageways 34 and 39 to the curved extension tubes 44 and 48 and out the openings 45 and 49 respectively. This portion of the air-flow is used to displace the gingival tissue during the impression procedure.

The remainder of the compressed air entering opening 47 would cause the plunger 26 to move forward and force the impression material through the opening of the expulsion head 31 to the desired site. This procedure for loading and taking impressions is the same for devices with either single or dual air channels. However, with the syringe having a single air channel, the operator has only one source of compressed air to use in displacing the gingival tissue.

As is evident from the above, the impression syringe of this invention may be connected to all conventional handpiece units for the expulsion of impressionable material. As a result, fatigue of the hand is reduced and the control and directional expulsion of the material from the device is accomplished in an efficient manner to effectively produce the optimum in perfection and quality of the end-product. Also, the displacement of the gingival tissue is accomplished by an air stream during the impression procedure reducing the necessity for mechanical or chemical tissue displacement.

Furthermore, the device may be loaded with the use of a conventional suction unit to prevent air bubble accumulation in the impression material. The latter procedure also reduces the potential of soiling hands and clothing with such material. In addition, the amount of air pressure may be easily regulated by the coordination of the conventional foot control and the newly designed hand control of this invention. And, the unit may be utilized with a wide variety of impression materials.

In conclusion, this method of impressioning permits consistent, uniform reproductions of prepared teeth without trauma to the periodontal structure and the unsightliness of the materials usually required to perform the conventional displacement procedures heretofore in use.

What is claimed is:

1. In an improved device for use in the deposition of impressionable material into a desired site during the fabrication process, the latter material being subsequently used for the casting of at least one synthetic tooth, said device having: a) a hollow housing having a first and second end of open construction, said housing containing a plunger longitudinally slideable in opposed directions; b) said first end adapted to receive interchangeable heads, one of said heads for use in the suction loading of impressionable material into said housing prior to use, and the other head for use in the ejection of said impressionable material from said housing during such fabrication; and c) said second end adapted with interchangeable fittings, one of said fittings for use in communication with a suction source during loading, and the other of said fittings for use in communication with a pressure source of the gaseous variety during said fabrication, the improvement consisting essentially of: valving means of a manual nature provided on said housing for control of the duration and intensity of air from a source to said site, said flow of air for use in the displacement of the peripheral tissue circumscribing said site, said valving means including at least one longitudinal passageway integral to the side of said housing for said air-flow, the latter air-flow being controlled by a longitudinal valve within said passageway.

2. The improved device of claim 1 wherein said valving means includes two longitudinal passageways integral to opposite sides of said housing for air-flow, the latter being controlled by a longitudinal valve in each of said passageways, all of said valves being manually actuated.

3. The improved device of claim 2 wherein each of said valves consists of a longitudinal passageway having a fixed longitudinal caming surface therein for separable engagement by a longitudinally moveable follower for the control of air-flow through said passageway.

4. The improved device of claim 3 wherein each of said valves is sequentially controlled by the positional relationship of said movable follower to said fixed longitudinal caming surface so that one of said valves is in the open position when the other of said valves is in the closed position.

* * * * *